Nov. 12, 1968        H. ERNYEI        3,410,293

IN-LINE BLENDING

Filed March 22, 1965        2 Sheets-Sheet 1

Inventor:
Herbert Ernyei
By Kemon, Palmer,
Stewart & Estabrook,
Attorneys

3,410,293
IN-LINE BLENDING
Herbert Ernyei, Paris, France, assignor to Societe Lignes Telegraphiques et Telephoniques, Paris, France, a joint-stock company of France
Filed Mar. 22, 1965, Ser. No. 441,735
Claims priority, application France, Apr. 6, 1964, 969,815
5 Claims. (Cl. 137—112)

ABSTRACT OF THE DISCLOSURE

There is disclosed in the specification and the drawings a digital electronic control system for controlling the flow rates of two or more components being blended in an in-line blending system. The system comprises digital means for sensing the flow rate in each input line for a blending tank and generates a series of pulses the frequencies of which are functions of the individual flow rates. The pulses are subtracted by an inhibitor and a resultant lower frequency pulse train is applied as an input to at least one digital integrator which later circuit is operatively connected on its output side to at least one digital valve. The valve is located in a component feed line to the blending tank. The integrator provides a digital output signal which is a function of the rate of digital information applied to the integrator and it controls the operation of the digital valve.

---

Figure 1:
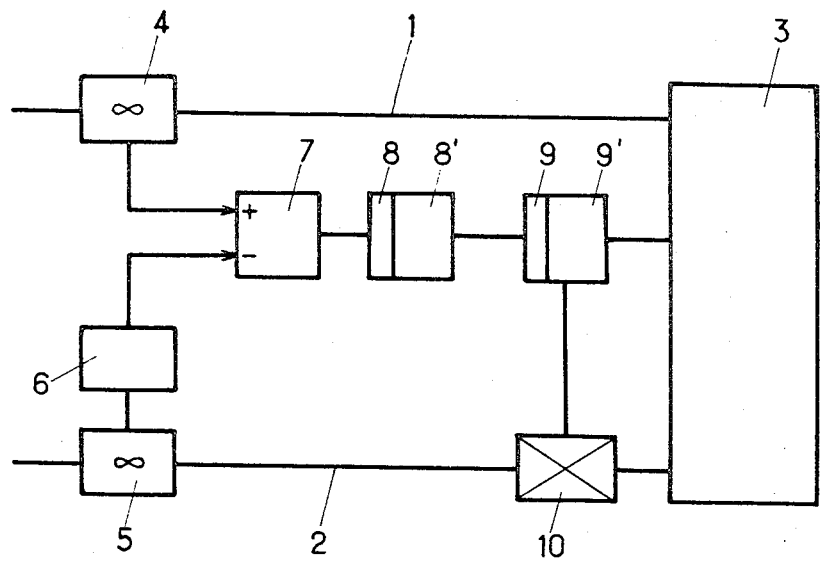

The invention concerns an all-electronic control system for in-line blending. In-line blending process consists in controlling the flow rates of several different components, liquids or not so that when a tank is filled with a blend of said components, their concentration ratios reach preset values. Analog electronic control systems for in-line blending are well-known. A conventional system is shown in FIGURE 1. Tank 3 is to be filled with a blend of two components flowing respectively through pipes 1 and 2. The concentration ratio is set to the value $k$, the volume of component which flows through 1 being $k$ times the volume through 2. Digital flow meters 4 and 5 measure the flow rate, that is to say the volume which flows through pipes 1 and 2 during a unit of time. Digital flow meters are most widely used because of the nature of the output signal delivered by the meter. Indeed, the output signal is a train of pulses, the frequency of which is proportional to the flow value. Handling of such signals is easier than handling of analog signals. In order to obtain readings corresponding to the volume of each constituent in tank 3, it is necessary to integrate the instantaneous flow rate values with respect to time from the beginning of the operation. The output from meter 5 is multiplied at 6 by parameter $k$. The volume error is obtained from the digital reversible counter 7 which simultaneously performs the integration. The digital output from 7 is transformed into an analog value in digital-to-analog converter 8. It constitutes the output signal for a proportional controller. In order to increase accuracy and stability of the loop a proportional-integral controller is preferably used. In this case, converter 8 feeds controller 8'. The analog output from 8' controls the control valve 10 through electropneumatic converter 9 and positioner 9'. The circuits which have been described operate in real time and are busy during the whole filling-up operation. If tank 3 is to be filled up with a blend of several components, it is necessary to provide as many identical sets of circuits as the number of components. Therefore, the system is very expensive and cumbersome and requires double supply: an electrical supply for the controller and a compressed air supply for the valve. As in any type of closed loop control system, stability is the most important requirement. When using a pneumatic valve, the time response of the valve is so long that experience has shown that the loop is not stable when the controller provides only proportional action. Stability requires a proportional-integral controller (or p-i controller). As already mentioned, the design of such p-i controller incorporates analog circuits (8').

It is an object of the invention to provide for a high stability all-digital proportional control system for in-line blending.

It is another object of the invention to provide digital means for proportional-integral control in in-line blending operating on the pneumatic positioners of the control valves.

It is another object of the invention to provide multiplexing means for connecting digital control circuits successively to the pneumatic positioners of each control valve in in-line blending.

It is another object of the invention to provide multiplexing means for connecting digital control circuits successively to each digital control valve in in-line blending.

The use of all-electronic digital system provides for the well-known advantages of digital systems, that is to say, high precision memorization of the data at any intermediate stage calculating unit operating at high speed with respect to real time and handling several parameters successively.

When the control system according to the present invention operates a digital control valve of the type described in co-pending application Serial Number 385,241 now Pat. No. 3,331,393 filed on July 27, 1964, for "Digital Valve," the complete in-line blending system is all electronic and digital. A double supply is no longer required, as the electronic circuits are solid-state designed, the reliability of the control system is very high. Except for the valve spindles there is no moving part in the system and therefore wearing out is eliminated. Moreover, wide adaptation of a given system to different flow rate ranges is easily obtained owing to the high variability of the digital valve according to the abovementioned application.

The invention will be better understood by reference to the following description and the accompanying drawings given merely as an illustration without limiting the scope of the invention.

In order to facilitate understanding of the system according to the invention, the circuits identical to circuits of FIGURE 1 bear the same reference numbers. 1 and 2 are pipes feeding tank 3. It is assumed that tank 3 is to be filled with a two component blend in order to simplify the explanation. But, it is to be understood that the blend may incorporate any number of components, as will be explained by reference to FIGURE 4. 4 and 5 are the two flow meters and digital multiplier 6 introduces parameter $k$ which figures the concentration ratio between the two components. The digital output from flow meter 4 which appears at 10 consists of a pulse train, the instantaneous frequency of said pulses being a measure of the flow rate. The output from 6 as explained later is a variable frequency pulse train, with some pulses missing delivered at 11. It should be remembered that $k$ is always smaller than 1. Signals at 10 and 11 are subtracted in subtractor 12. The difference represents the error on the flow rates at a given instant, that is to say the instantaneous value of the variation of the error on the volume of each component which is already into tank 3. The error on the volume already in tank 3 is the integral with respect to time of this value, calculated since the beginning of the filling up operation.

Digital subtractor 12 gives the flow rate error signal which is integrated in integrator 13 made of a binary reversible counter which keeps on counting during the whole operation. The output from 13 represents the error on the volume through pipe 1. This signal can be used directly to operate a digital valve 14 of the type described in patent application Serial Number 385,241 filed on July 27, 1964, for "Digital Valve." As mentioned in said application, the time response of the digital valve is much shorter than the time constant of available pneumatic control valves. It is therefore possible to obtain stable operation by using a controller with proportional action body. It is possible to show by a rather simple calculation that the precision is set by the flow meter at about 1%. Indeed, the volume error due to the control system itself is given by $$Dv = Q/qm$$

where $Q$ is the total flow rate, $q$ is one quantum flow rate of the digital valve (flow rate corresponding to the lowest weight digit) and $m$ is the number of pulses from the flow meter when a volume corresponding to flow rate $q$ has flowed during a given time.

All the circuits enumerated above are well known in the art. Digital flow meters 4 and 5 are commercially available as turbine flow meters such as types FL6SB through FL 40SB, depending on the flow range, as supplied by Foxboro-Waugh Company. Multiplier 6 is an operational multiplier by $k$ smaller than 1 acting as a frequency dividing counter consisting of a logic circuit digitally controlled by the coded value of $k$, so as to feed some of the pulses from the flow meter to the output and by-passing the others according to the coded $k$ signal. Such a multiplier is fully described in Computer Handbook published by McGraw-Hill under the direction of H. D. Huskey and G. A. Korn pages 21–72. The details of the circuit appear as FIGURES 21–38.

Digital subtractor 12 is actually an inhibitor receiving the variable frequency pulses from flow meter 4 and the variable frequency pulses (with missing pulses) from multiplier 6. The frequency of the outputs from commercially available turbine flow meters is about a few hundreds of cycles per second. Such frequency is much too high to operate a valve, even a digital valve. Subtractor 12 inhibits the transfer of any coming pulses to the counter 13 whenever pulses arrive alternately on line 10 and 11 and allows only the second pulse on a given line to pass provided no pulse has come through the other line. The principle of operation of such a subtractor is fully explained in the article entitled "Digital Rate Synthesis for Frequency Measurement and Control" by T. J. Rey published in the December 1959 issue of the Proceedings of the Institute of Radio Engineers, page 2106. Appendix B, page 2112 explains the operation of subtractor 12. As mentioned, the design of such a subtractor requires only well known circuits.

Counter 13 is a bidirectional binary counter or reversible counter as described in Electronics for September 25, 1959, pages 82–83, by H. J. Weber under the title: "Binary Circuits Count Backwards and Forwards." It consists of a series of binary stages and gated circuits between the backward and forward lines and between the binary storage elements which actually count.

Figure 2:
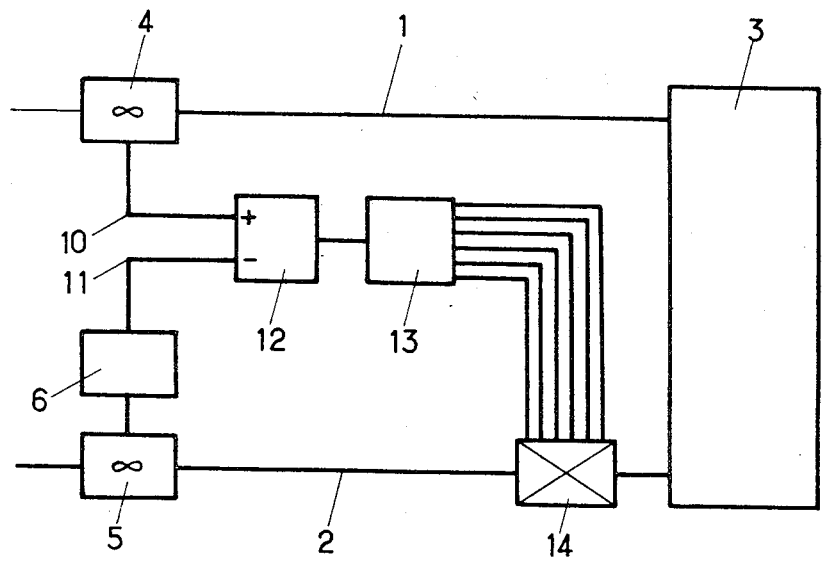

The controller which is represented on FIGURE 2 is a proportional controller, that is valve 14 is actuated by a signal proportional to the error on the volume of the component flowing through pipe 2. In order that the control actions exists, it is necessary that an error on the volume exists. This way of operation provides for zero error on the flow rates. The volume error is almost constant and negligible for large quantities or with fast acting digital valves as already mentioned.

Figure 3:
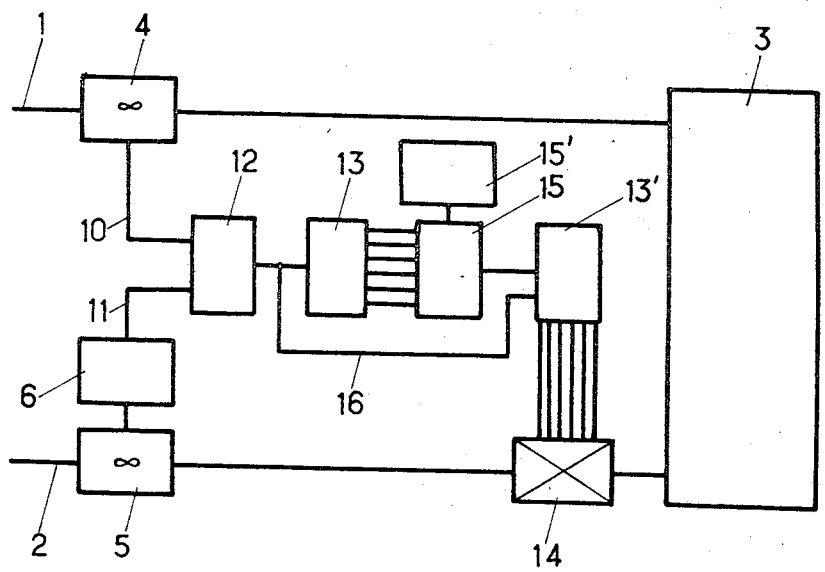

FIGURE 3 shows another embodiment of the system in which the controller is of the proportional-integral type and provides for a zero error on the volume in the tank operation. Pipes 1 and 2 feed tank 3. Up to integrator 13 the circuits are identical with the ones already mentioned in reference to FIGURE 2. The output from 13 feeds an operational multiplier stage 15, 15' similar to 6, and a second digital integrating stage 13' similar to 13 which receives also part of the output signal from digital subtractor 12 through direct line 16. Valve 14 is controlled by this proportional-integral controller. Operational multiplier 15, 15' is fed with the digital signal from integrator 13 which is the error on the volume of the components already filling tank 3. Operational multiplier 15 is made of a logic circuit 15 operating on a fixed frequency pulse generator 15'. The output is a pulsed signal the instantaneous frequency of which is the product of the digital output from 13 multiplied by a constant parameter corresponding to the frequency of source 15'. Thereby, the controlling signal for the control valve 14 is made of two signals, the first signal corresponds to the flow rate error 16 integrated in 13'. It is therefore proportional to the error on the volumes. The second signal is the flow rate error signal integrated successively in 13 and 13'. It is therefore the integral of the volume error and allows for an operation at zero error value on the volume as well known per se.

Figure 4:
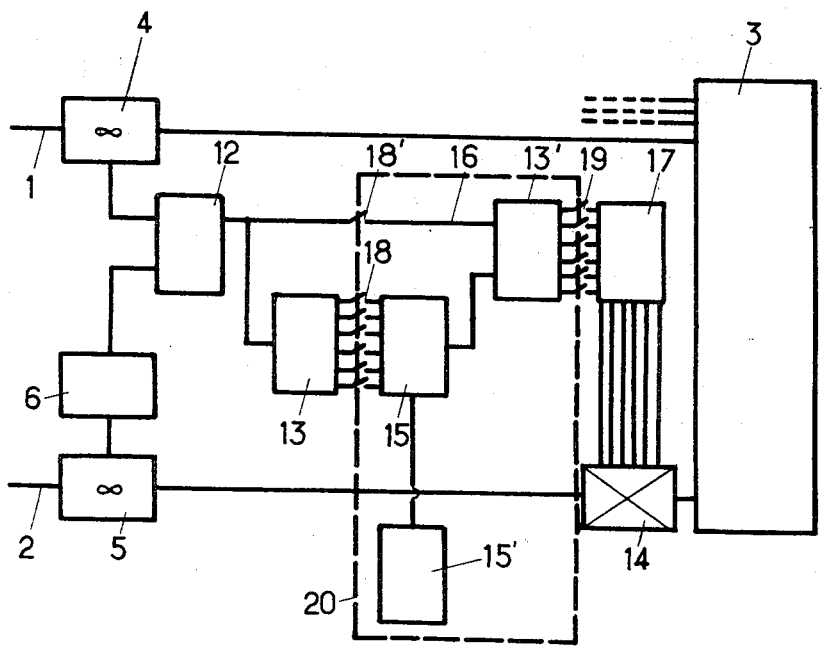

FIGURE 4 represents the same system as FIGURE 3 in the case where the blend filling up tank 3 is made of more than two components. As already mentioned, one of the advantages of the system according to the invention lies in the fact that at least part of the circuitry can be used to control several components owing to the difference in the speed of calculation of the digital control circuit and valve 14. In the case of proportional-integral controller, it is possible to use the second integrator 13' and its associated circuit to control the flow rate of several components without decreasing the system precision. In other words, these circuits will control a given component only for a preset time interval according to the well known time sampling technique with output holder and then the circuits are switched to the control of another component for the same time interval. The dashed line 20 contains the circuits which may be used successively to control several components. Multiposition switches 18, 18' and 19 are simultaneously controlled from a time unit not shown which sets up the time sampling period. As shown, the output signal from 13' is stored in a memory 17 which controls continuously valve 14 like "zero order holder" even during the time intervals when the circuits inside line 20 are connected to the controller for another component. Memory 17 is made of a series of self-sustained relays which control the supply to the digital valve.

Multiposition switches 18, 18' and 19 are currently available telephone relays. Solid state switch can also be used as well known per se.

The systems which have been described incorporate a digital valve 14 according to a preferred embodiment of the invention. However, any type of regulating valve can be used provided a digital-analog converter, an electro-pneumatic converter and a pneumatic positioner are used between integrator 13' (or memory 17 in the case of FIGURE 4) and valve 14 as mentioned with reference to FIGURE 1.

In the three embodiments just described the concentration rates are preset with respect to the flow through pipe 1. Actually, it is often easier to preset the concentration rates (that is the value of parameter $k$ for each constituent) with respect to the total blend filling tank 3. In this case, pipe 1 should also be provided with a digital multiplier such as 6 and the controller should be identical to the one used for line 2.

I claim:

1. An automatic control system for in-line blending comprising digital means for individually measuring the flow rates of the $n$ components to be blended, at least $(n-1)$ first digital multiplying means for multiplying each of said digital flow rate values minus at most one by individual preset parameters, at least $(n-1)$ first digital subtractors, at least $(n-1)$ first digital reversible $p$ digit counters, a first set of $p$ controlled switches with at least $(n-1)$ positions for feeding successively the output from each of said at least $(n-1)$ first digital counters to a second digital multiplying means feeding a second $p$ digit reversible binary counter, means for successively connecting each of said at least $(n-1)$ first digital subtractors to said second $p$ digit reversible binary counter, a second set of $p$ controlled switches with at least $(n-1)$ positions for feeding successively the output from said second binary reversible counter to at least $(n-1)$ storage units, feeding at least $(n-1)$ digital to analog converters and at least $(n-1)$ electric to pneumatic converters controlling at least $(n-1)$ control valves and a time base to control synchronously said first and second sets of $p$ multiposition switches and said at least $(n-1)$ switches.

2. An automatic control system for in-line blending comprising digital means for individually measuring the flow rates of the $n$ components to be blended, at least $(n-1)$ first multiplying digital means for multiplying each of said digital flow rate values minus at most one by individual preset parameters, at least $(n-1)$ first digital subtractors, at least $(n-1)$ first digital reversible $p$ digit counters, a first set of $p$ controlled switches with at least $(n-1)$ positions for feeding successively the output from each of said at least $(n-1)$ first digital counters to a second digital multiplying means feeding a second $p$ digit reversible binary counter, means for successively connecting each of said at least $(n-1)$ first digital subtractors to said second $p$ digit reversible binary counter, a second set of $p$ controlled switches with at least $(n-1)$ positions for feeding successively the output from said second binary reversible counter to at least $(n-1)$ storage units, feeding at least $(n-1)$ digital control valves and a time base to control synchronously said first and second sets of $p$ multiposition switches and said at least $(n-1)$ switches.

3. An automatic digital control system for an in-line blending system comprising:
digital measuring means for measuring the flow rate of the components to be blended and for providing digital output signals that are functions of flow rate;
multiplier means operatively connected to at least one of said measuring means for multiplying the digital flow rate signals from said measuring means by a preset parameter;
digital frequency reduction means each being operatively connected to one of said measuring means and to one of said multiplier means for providing digital output signals in response to signals inputted to said frequency reduction means;
digital valve means located in feed lines of said blending system; and,
binary-reversible counter means operatively connected to said frequency reduction means and said digital valve means for providing digital valve operating control signals to said valve means as a function of the output signals of said frequency reduction means.

4. A control system according to claim 3 wherein at least two binary reversible counters are operatively connected to said frequency reducing means, and further comprising means for connecting the output of one of said counters to the input of the other of said counters to thereby provide at least two control signals to said valve means.

5. A control system according to claim 4 wherein said connecting means includes an operational multiplier for multiplying the digital signal outputted by the counter by a fixed parameter to thereby provide tank volume dependent digital signals on the input of the other counter.

References Cited

UNITED STATES PATENTS 3,129,323   4/1964   Stout _____ 235—151.12

OTHER REFERENCES

I.R.E. Transactions on Industrial Electronics, Charles A. Hill, Packard Bell Computer, Los Angeles, Calif., December 1962, pp. 108–116.

WILLIAM F. O'DEA, *Primary Examiner.*

WILLIAM H. WRIGHT, *Assistant Examiner.*